(12) United States Patent
Sundararajan et al.

(10) Patent No.: US 11,767,782 B2
(45) Date of Patent: Sep. 26, 2023

(54) REDUCTANT DOSING SYSTEM WITH CALIBRATION VALUE DETERMINED BASED ON DATA FROM PRESSURE SENSOR ASSEMBLY AND METHOD OF CALIBRATING A REDUCTANT DOSING SYSTEM

(71) Applicant: CUMMINS EMISSION SOLUTIONS INC., Columbus, IN (US)

(72) Inventors: Vikram Sundararajan, Columbus, IN (US); Masoud Ziabakhsh Deilami, Columbus, IN (US); Catherine Alviz-Radi, Irving, TX (US); Joe V. Hill, Columbus, IN (US); Patrick E. Conlon, Indianapolis, IN (US); Stephen M. Holl, Columbus, IN (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 168 days.

(21) Appl. No.: 17/056,077

(22) PCT Filed: May 25, 2018

(86) PCT No.: PCT/US2018/034652
§ 371 (c)(1),
(2) Date: Nov. 17, 2020

(87) PCT Pub. No.: WO2019/226174
PCT Pub. Date: Nov. 28, 2019

(65) Prior Publication Data
US 2021/0231040 A1    Jul. 29, 2021

(51) Int. Cl.
*F01N 3/20* (2006.01)
*B01D 53/94* (2006.01)

(52) U.S. Cl.
CPC ......... *F01N 3/208* (2013.01); *B01D 53/9427* (2013.01); *B01D 53/9495* (2013.01);
(Continued)

(58) Field of Classification Search
CPC .... B01D 2251/2062; B01D 2251/2067; B01D 53/9427; B01D 53/9495; F01N 11/00;
(Continued)

(56) References Cited

U.S. PATENT DOCUMENTS 6,615,128 B1    9/2003   Helmich
8,920,757 B1   12/2014   Chandrapati et al.
(Continued)

FOREIGN PATENT DOCUMENTS

WO    WO-2016/178648 A1    11/2016
WO    WO-2018/106812 A1     6/2018

OTHER PUBLICATIONS

International Search Report and Written Opinion issued for PCT/US2018/034652, dated Aug. 27, 2018, 17 pages.

*Primary Examiner* — Carl C Staubach
*Assistant Examiner* — Diem T Tran
(74) *Attorney, Agent, or Firm* — Foley & Lardner LLP

(57) ABSTRACT

A reductant dosing system includes: an injector; a fixed displacement pump in fluid communication with the injector; a reductant source in fluid communication with the fixed displacement pump; a pressure sensor assembly configured to detect a pressure of reductant in the reductant dosing system; and a controller communicatively coupled to the fixed displacement pump and to the pressure sensor assembly, wherein the controller is configured to calculate a flow rate of the fixed displacement pump based on at least a calibration value determined based on data received from the pressure sensor assembly.

18 Claims, 8 Drawing Sheets

(52) U.S. Cl.
CPC ..... *F01N 2610/11* (2013.01); *F01N 2610/148* (2013.01); *F01N 2610/1433* (2013.01); *F01N 2900/04* (2013.01); *F01N 2900/1808* (2013.01)

(58) Field of Classification Search
CPC ............... F01N 13/009; F01N 2240/40; F01N 2560/08; F01N 2610/02; F01N 2610/11; F01N 2610/1433; F01N 2610/144; F01N 2610/1453; F01N 2610/146; F01N 2610/148; F01N 2900/04; F01N 2900/1808; F01N 2900/1811; F01N 2900/1821; F01N 2900/1822; F01N 3/2066; F01N 3/208; Y02C 20/10; Y02T 10/12; Y02T 10/40
See application file for complete search history.

(56) References Cited

U.S. PATENT DOCUMENTS

| | | |
|---|---|---|
| 8,943,808 B2 | 2/2015 | Li et al. |
| 2008/0178580 A1* | 7/2008 | Zapf .................... F01N 3/36 702/100 |
| 2015/0104363 A1 | 4/2015 | Singh et al. |
| 2015/0354491 A1* | 12/2015 | Ulrey .................. F02D 41/3845 123/294 |
| 2016/0010529 A1 | 1/2016 | Wang et al. |
| 2016/0040580 A1 | 2/2016 | Khaled et al. |
| 2017/0096927 A1* | 4/2017 | Giordano .............. F01N 11/007 |

* cited by examiner

REDUCTANT DOSING SYSTEM WITH CALIBRATION VALUE DETERMINED BASED ON DATA FROM PRESSURE SENSOR ASSEMBLY AND METHOD OF CALIBRATING A REDUCTANT DOSING SYSTEM

CROSS-REFERENCE TO RELATED APPLICATIONS

The present application is a National Phase Application of PCT/US2018/034652, filed May 25, 2018, the contents of which are hereby incorporated by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia or urea, is typically introduced into the exhaust gas flow prior to the catalyst chamber. To introduce the reductant into the exhaust gas flow for the SCR process, an SCR system may dose or otherwise introduce the reductant through an injector that vaporizes or sprays the reductant through a nozzle into an exhaust pipe of the exhaust system up-stream of the catalyst chamber. The SCR system may include one or more sensors to monitor conditions within the exhaust system.

SUMMARY

One implementation relates to a reductant dosing system comprising an injector, a fixed displacement pump in fluid communication with the injector, a reductant source in fluid communication with the fixed displacement pump, a pressure sensor assembly, and a controller communicatively coupled to the fixed displacement pump and to the pressure sensor assembly. The controller is configured to receive from the pressure sensor assembly data that includes the detected pressure of the reductant and the calibration value, and to calculate a flow rate of the fixed displacement pump based on at least the detected pressure and the calibration value. In some implementations, the controller is configured to determine the calibration value by interpreting an offset at zero pressure as the calibration value. In some implementations, the controller is configured to interpret an offset at zero pressure as the calibration value when power is first applied to the reductant dosing system. In some implementations, the controller is configured to compensate for the interpreted offset at zero pressure while operating the fixed displacement pump. In some implementations, the controller is configured to determine the calibration value by decoding a multiplexed signal on an analog voltage output of the pressure sensor assembly, wherein the multiplexed signal is a combination of a bit stream of the calibration value and an analog voltage output of the pressure sensor assembly correlated to a pressure detected by the pressure sensor assembly. In some implementations, the controller is configured to determine the calibration value assembly by decoding a bit stream on an analog voltage output of the pressure sensor assembly, wherein the bit stream is sent from the pressure sensor assembly for a predetermined amount of time, after which the analog voltage output of the pressure sensor assembly is a pressure voltage signal correlated to a pressure sensor reading of the pressure sensor assembly.

Another implementation relates to a method of calibrating a reductant dosing system comprising detecting, by a pressure sensor assembly, a pressure of reductant in the reductant dosing system, receiving, by a controller from the pressure sensor assembly, data that includes the detected pressure of the reductant and a calibration value, and operating, by the controller, a fixed displacement pump based on at least the detected pressure of the reductant and the calibration value. In some implementations, the method further comprises determining, by the controller, the calibration value by interpreting an offset at zero pressure as the calibration value. In some implementations, the method further comprises interpreting, by the controller, an offset at zero pressure as the calibration value when power is first applied to the reductant dosing system. In some implementations, the method further comprises compensating for the interpreted offset at zero pressure while operating the fixed displacement pump. In some implementations, the method further comprises determining the calibration value by decoding a multiplexed signal on an analog voltage output of the pressure sensor assembly, wherein the multiplexed signal is a combination of a bit stream of the calibration value and an analog voltage output of the pressure sensor assembly correlated to a pressure detected by the pressure sensor assembly. In some implementations, the method further comprises, sending a request, by the controller, to the pressure sensor assembly, wherein the controller is communicatively coupled to the pressure sensor assembly by a one wire interface and the multiplexed signal is generated responsive to the request sent by the controller using the one wire interface to the pressure sensor assembly. In some implementations, the method further comprises determining the calibration value by decoding a bit stream on an analog voltage output of the pressure sensor assembly, wherein the bit stream is sent from the pressure sensor assembly for a predetermined amount of time, after which the analog voltage output of the pressure sensor assembly is a pressure voltage signal correlated to a pressure sensor reading of the pressure sensor assembly.

In some implementations, the multiplexed signal is generated continuously as the combination of the bit stream of the calibration value and the analog voltage output of the pressure sensor assembly correlated to the pressure detected by the pressure sensor assembly. In some implementations, the multiplexed signal is generated at set intervals as the combination of the bit stream of the calibration value and the analog voltage output of the pressure sensor assembly correlated to the pressure detected by the pressure sensor assembly. In some implementations, the bit stream has a defined start and end sequence. In some implementations, the controller is communicatively coupled to the pressure sensor assembly by a one wire interface and the multiplexed signal is generated responsive to a request sent by the controller using the one wire interface to the pressure sensor assembly.

BRIEF DESCRIPTION OF THE DRAWINGS

The details of one or more implementations are set forth in the accompanying drawings and the description below.

Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant dosing. The present disclosure describes determining a calibration value based on data received from a pressure sensor assembly and operating a fixed displacement pump based on at least the determined calibration value. More particularly, the present disclosure describes determining a calibration value based on data received from a pressure sensor assembly, and calculating a flow rate of a fixed displacement pump using the calibration value. The pressure sensor assembly may be coupled directly to the fixed displacement pump in the flow path. The reading of and use of the calibration value to determine a flow rate and/or operate the fixed displacement pump may be implemented by a controller that also controls the fixed displacement pump during dosing operations. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some implementations of an aftertreatment system, a fixed displacement pump may be implemented to pump reductant to an injector. A fixed displacement pump can deliver a substantially fixed flow rate of reductant based on a pump displacement or frequency. However, as the flow rate increases, resistive pressure in the fluid lines may decrease the flow rate at corresponding pump displacements or frequencies. However, even with the decreased flow rates, the flow rate to pump displacement or frequency maintains a substantially linear relationship. Accordingly, using a pump frequency and pump output pressure, which is indicative of the resistive pressure, a controller can accurately dose reductant with reduced calculations and input variables. For instance, the flow rate from a fixed displacement pump can be calculated as a function of pump frequency, pressure differential, and temperature of the reductant. In some implementations, the voltage of a battery providing power to the fixed displacement pump can be used to further refine the flow rate function. The foregoing can be considered a flow or frequency control system.

II. Overview of Aftertreatment System

Figure 1:
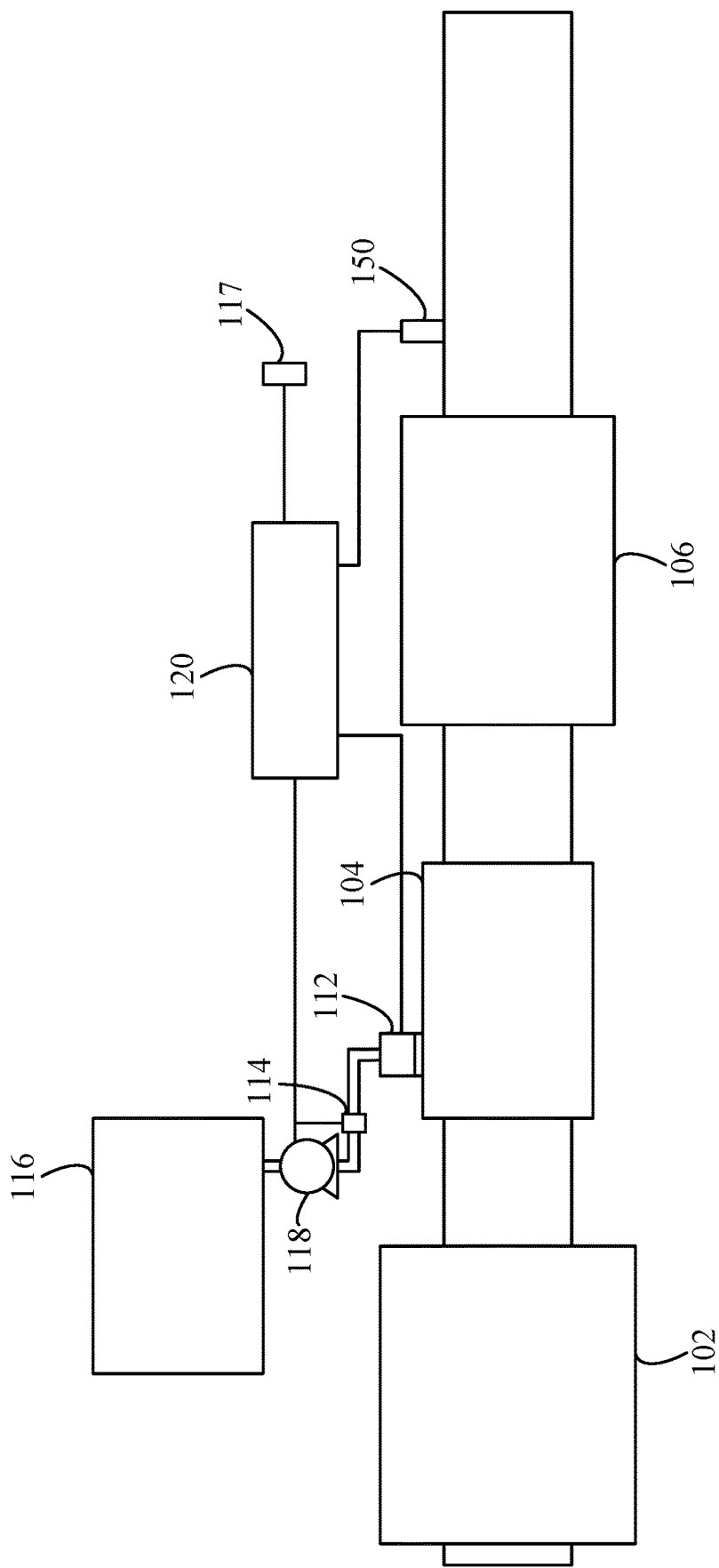
FIG. 1 is a block schematic diagram of an example selective catalytic reduction system for an exhaust system.

FIG. 1 depicts an embodiment of an aftertreatment system for an exhaust system. The aftertreatment system includes a particulate filter, for example a diesel particulate filter (DPF) 102, an injector 112, a pressure sensor assembly 114, a reductant tank 116, an ambient pressure sensor 117, a pump 118, a controller 120, a reactor pipe or decomposition chamber 104, a SCR catalyst 106, and a sensor 150.

The DPF 102 is configured to remove particulate matter, such as soot, from exhaust gas flowing in the exhaust system. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system having an injector 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the injector 112 mounted to the decomposition chamber 104 such that the injector 112 may dose the reductant into the exhaust gases flowing in the exhaust system. The injector 112 is fluidly coupled to one or more reductant tank 116. In some implementations, a pump 118 may be used to pressurize the reductant from the reductant tank 116 for delivery to the injector 112. The ambient pressure sensor 117 is configured to output a signal related to detected ambient pressure of the system. In some implementations, the detected ambient pressure is comparable to the detected pressure off the pressure sensor assembly 114 when pump 118 is inactive.

The injector 112, pressure sensor assembly 114, ambient pressure sensor 117, and pump 118 are also electrically or communicatively coupled to a controller 120. The controller 120 is configured to control the injector 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

In certain implementations, the controller 120 is configured to perform certain operations, such as those described herein in relation to FIGS. 3-6. In certain implementations, the controller 120 forms a portion of a processing subsystem including one or more computing devices having memory, processing, and communication hardware. The controller 120 may be a single device or a distributed device, and the functions of the controller 120 may be performed by hardware and/or as computer instructions on a non-transient computer readable storage medium.

In certain implementations, the controller 120 includes one or more modules configured to functionally execute the operations of the controller 120. In certain implementations, the controller 120 may include a frequency control circuit, a pressure control circuit, and a system switch control circuit for performing the operations described in reference to FIGS. 3-6. The description herein including circuits emphasizes the structural independence of the aspects of the controller 120 and illustrates one grouping of operations and responsibilities of the controller 120. Other groupings that execute similar overall operations are understood within the scope of the present application. Circuits may be implemented in hardware and/or as computer instructions on a non-transient computer readable storage medium, and circuits may be distributed across various hardware or computer based components.

Example and non-limiting circuit implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the circuit specification, any actuator including at least an electrical, hydraulic, or pneumatic actuator, a solenoid, an op-amp, analog control elements (springs, filters, integrators, adders, dividers, gain elements), and/or digital control elements.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system.

The exhaust system may further include an oxidation catalyst, for example a diesel oxidation catalyst (DOC), in fluid communication with the exhaust system (e.g., downstream of the SCR catalyst 106 or upstream of the DPF 102) to oxidize hydrocarbons and carbon monoxide in the exhaust gas.

In some implementations, the DPF 102 may be positioned downstream of the reactor pipe or decomposition chamber 104. For instance, the DPF 102 and the SCR catalyst 106 may be combined into a single unit, such as a DPF with SCR-coating (SDPF). In some implementations, the injector 112 may instead be positioned downstream of a turbocharger or upstream of a turbocharger.

The sensor 150 may be coupled to the exhaust system to detect a condition of the exhaust gas flowing through the exhaust system. In some implementations, the sensor 150 may have a portion disposed within the exhaust system, such as a tip of the sensor 150 may extend into a portion of the exhaust system. In other implementations, the sensor 150 may receive exhaust gas through another conduit, such as a sample pipe extending from the exhaust system. While the sensor 150 is depicted as positioned downstream of the SCR catalyst 106, it should be understood that the sensor 150 may be positioned at any other position of the exhaust system, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensors 150 may be utilized for detecting a condition of the exhaust gas, such as two, three, four, five, or six sensors 150 with each sensor 150 located at one of the foregoing positions of the exhaust system.

In some implementations a pump outlet pressure sensor assembly 114 can be included at the outlet of the pump 118, in a line from the pump 118 to the injector 112, in the injector 112, and/or in the return line from the injector 112 to the reductant tank 116. The controller 120 is communicatively and/or electrically coupled to the fixed displacement pump 118 and a injector 112. In some implementations the controller 120 may control an input voltage to the pump 118 and/or injector 112 to control operation of the pump 118 and/or injector 112. In other implementations, the controller 120 may include a data line to the pump 118 and/or injector 112 such that a parameter value may be passed to the pump 118 and/or injector 112 for internal control circuitry of the pump 118 and/or injector 112 to control operation thereof. The controller 120 may also be communicatively and/or electrically coupled to the pressure sensor assembly 114 to access and/or receive data values indicative of a measured pressure by the pressure sensor assembly 114 (e.g., voltages output by and/or accessed from the pressure sensor assembly 114 and/or parameter values output by and/or accessed from the pressure sensor assembly 114).

The reductant tank 116 is in fluid communication with the pump 118 at a pump inlet and the injector 112 is in fluid communication with the pump 118 at a pump outlet. Thus, the controller 120 can control operation of the fixed displacement pump 118 to pump reductant from the reductant tank 116 via the pump inlet and deliver reductant to the injector 112 from the pump outlet at a desired flow rate using a pump frequency based on the linear relationship between flow rate and pump frequency. In some implementations, the injector 112 may include an outlet for a return line to be in fluid communication with the reductant tank 116. Thus, reductant can also be pumped from the reductant tank 116 and circulated through the injector 112 and back to the reductant tank 116 via the return line. In some implementations, the system may circulate reductant from the reductant tank 116, through the pump 118, injector 112, and return line only when the injector 112 is not dosing reductant into the exhaust system. In other implementations, the system may also circulate reductant from the reductant tank 116, through the pump 118, injector 112, and return line when the injector 112 is dosing reductant into the exhaust system.

Based on a desired dosing rate (e.g., a flow rate of reductant through a nozzle of the injector 112 into the exhaust system to reduce exhaust emissions), the controller 120 can modify an input voltage and/or pump frequency command to the pump 118 to achieve a desired flow rate out of the fixed displacement pump 118. In implementations where a calibration value is received from the pump outlet pressure sensor assembly 114, the flow rate from the outlet of the pump 118 can be increased or decreased to maintain a system flow rate at a desired reductant flow rate. That is, for a desired dosing rate, a measured pump output pressure, and a calibration value, a desired pump outlet flow rate can be calculated. In implementations where the system includes the return line and circulates reductant while dosing reductant from the injector 112, the flow rate from the outlet of the pump 118 can be increased or decreased to maintain a system flow rate as the dosing rate changes. That is, for a desired dosing rate, a desired reductant recirculation flow rate, and a measured pump output pressure (i.e., the resistive pressure), a desired pump outlet flow rate can be calculated. Using the desired pump outlet flow rate, the controller 120 can output a pump frequency parameter value and/or control an input voltage to the fixed displacement pump 118 to achieve the desired pump outlet flow rate using the lookup table and/or linear equation(s) for the measured pump outlet pressure.

The pump pressure target is output to the pump pressure feedback control that uses a measured pump outlet pressure value, such as one accessed and/or received from a pressure sensor assembly 114 at the pump outlet, in the line from the pump 118 to the injector, in the injector, and/or in the return line, for feedback control of a pump frequency command that is to be output to the fixed displacement pump 118. In some implementations, the feedback control may be a PID (proportional-integral-derivative) feedback control. The feedback control compares the pump pressure target to the measured pump outlet pressure and outputs a pump frequency command based on the feedback control provided by the measure pump outlet pressure. The pump frequency command may be output to the fixed displacement pump 118 to pump reductant from the reductant tank 116 through the outlet of the pump 118 to the injector via an outlet line and back to the reductant tank 116 via a return line.

The measured pump pressure is measured by a pressure sensor assembly 114 downstream of the pump 118 and outputs and/or includes an accessible calibration value. In some implementations, the calibration value is stored in the pressure sensor assembly 114 and output on an analog signal line off the pressure sensor assembly 114.

III. Calibration System

Figure 2:
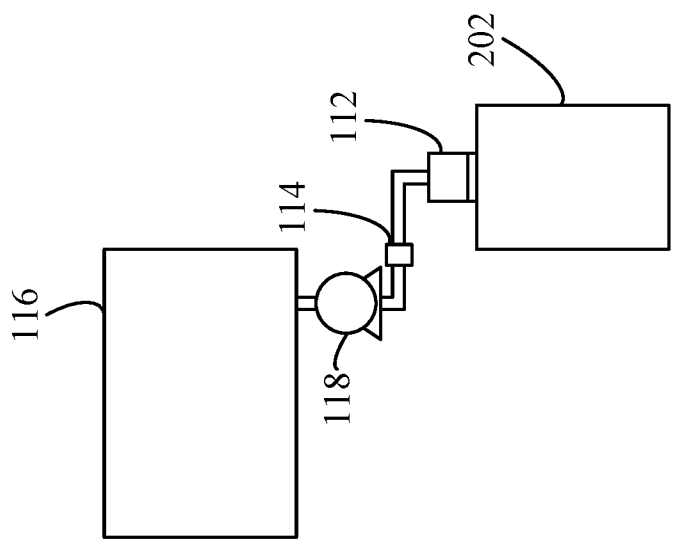
FIG. 2 is a block diagram of an example parameter calibration system including a sensor for components of a reductant deliver system for an exhaust system.

FIG. 2 depicts an embodiment of a calibration system for a pump 118 having an example reductant tank 116, pump 118, injector 112 and test assembly 202.

The test assembly 202 includes the injector 112 mounted to the test assembly such that the injector 112 may dose reductant or similar test fluid into the test assembly 202. The test assembly 202 is fluidly coupled to the injector 112. The injector 112 is fluidly coupled to one or more reductant tanks 116 with a pump 118 that may be used to pressurize the reductant from the reductant tank 116 for delivery to the injector 112. The injector 112 can be a known injector which may be a master part which flows a target flow rate at a target pressure (e.g., 8.0 L/hr at 8 bar(g)). The test assembly 202 is a measurement device to accurately measure one or more parameters of fluid (e.g., reductant) delivered by the injector 112. The one or more parameters measured are flow, pressure differential across orifice of the injector, weight, volume, and the like of the fluid. The injector 112 can be selected to always reach the target pressure differential for any attached pump capacity of pump 118.

In some implementations, the test assembly 202 determines a frequency or speed (e.g., a frequency in Hz, a speed in RPM, and the like) to be recorded in a pressure sensor assembly as a calibration value associated with the pump 118 when testing the pump 118 at a fixed pressure (e.g., 8 bar(g)). In some implementations, the test assembly 202 determines a pressure differential value to be recorded in a pressure sensor assembly 112 as a calibration value associated with the pump 118 attached to the test assembly 202 when testing the pump 118 at a fixed speed or frequency (e.g., 32 Hz).

IV. Methods of Using Signal Output Characteristics of a Sensor for Storing a Flow Rate Calibration Referring now to FIG. 3, a method or process of operating a pump 118 based on detected pressure and a calibration value is depicted in a flow diagram according to an example implementation. In brief, the method comprises detecting, by a pressure sensor assembly 114, a pressure of reductant in the reductant dosing system, receiving, by a controller 120 from the pressure sensor assembly 114, data that includes the detected pressure of the reductant and a calibration value, and operating, by the controller 120, a fixed displacement pump 118 based on at least the detected pressure of the reductant and the calibration value.

Figure 3:
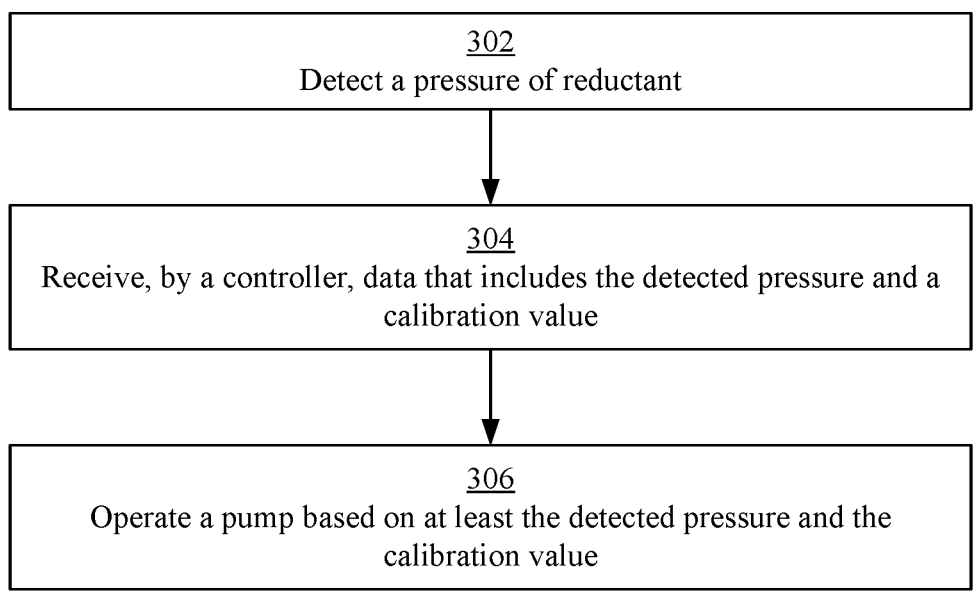
FIG. 3 is a flow diagram depicting operating a pump based on detected pressure and a calibration value according to an example implementation.

Still referring to FIG. 3 and in more detail, a pressure of reductant is detected at 302. Detecting a pressure of reductant in the reductant dosing system can include interpreting an output of a pressure sensor of the pressure sensor assembly 114 and outputting a sensor analog voltage output correlated to the output of the pressure sensor of the pressure sensor assembly 114.

Data that includes the detected pressure and a calibration value is received at 304. In some embodiments, the method comprises determining, by the controller 120, the calibration value by interpreting an offset at zero pump pressure as the calibration value. The offset at zero pump pressure is an offset added to the detected pressure when the pump is inactive and therefore corresponds to an offset to ambient pressure in the system. The calibration value may be determined by receiving the output of the pressure sensor assembly 114, interpreting the output as a pressure reading, and subtracting ambient pressure to calculate the offset at zero pump pressure (relative pressure, bar (g)) of the pressure sensor assembly 114 as the calibration value. The ambient pressure can be obtained from a separate ambient pressure sensor (e.g., ambient pressure sensor 117). In some implementations, the offset representing the calibration value is only added to the output of the pressure sensor assembly 114 when the pump is inactive. In some implementations, the offset is always added to the output off the pressure sensor assembly 114 and the offset is therefore trimmed during normal operation of the pump and of the internal combustion engine.

In some embodiments, the method comprises determining, by the controller 120, the calibration value by decoding a multiplexed signal on an analog voltage output of the pressure sensor assembly 114, wherein the multiplexed signal is a combination of a bit stream of the calibration value and an analog voltage output of the pressure sensor assembly 114 correlated to a pressure detected by the pressure sensor assembly 114. The calibration value may be multiplexed continuously and sent as a continuous signal on the sensor analog voltage output of the pressure sensor assembly 114. The calibration value may not be multiplexed on to the sensor analog voltage output continuously, but can instead be decoded at set intervals or on certain conditions. Conditions may include a key on condition, a received request to send the calibration value, and the like. A receive request and send implementation may include a one wire interface communication method where the calibration value is requested and a stop command sent once the value is received (e.g., by the ECM). The calibration value is then decoded from the signal received after the request is made. In another implementation, the calibration value is decoded from a bit stream delivered using the sensor analog voltage output of the pressure sensor assembly 114 for a predetermined amount of time. The bit stream may have a defined start and end sequence. After the predetermined amount of time, the sensor analog voltage output returns to being the pressure voltage signal and the calibration value can no longer be decoded. A receive request and send implementation may include a one wire interface communication method where the calibration value is requested and the value decoded during a predetermined amount of time where the value is sent (e.g., received and decoded by the ECM). Decoding of the calibration value may include detection of whether a valid value or a faulty value is received.

A pump 118 is operated based on at least the detected pressure and the calibration value at 306. Operating a fixed displacement pump 118 based on at least the detected pressure of the reductant and the calibration value can include modifying an input voltage and/or pump frequency command to the pump 118 to achieve a desired flow rate out of the fixed displacement pump 118. In some implementations, the calibration value is used along with the detected pressure differential at the pressure sensor assembly 114 to calculate the flow rate out of the fixed displacement pump 118.

Figure 4:
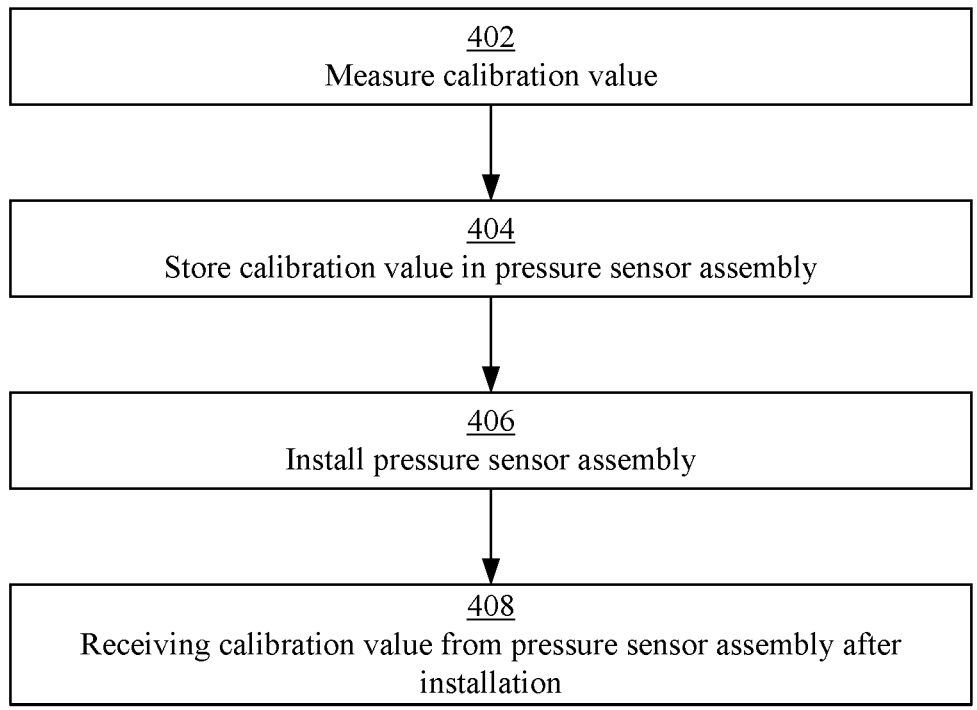
FIG. 4 is a flow diagram depicting storing a calibration value in a pressure sensor assembly according to an example implementation.

Additional components of the method, prior to decoding of the calibration value, are depicted in FIG. 4 as a method or process of storing a calibration value in a pressure sensor assembly 114 according to an example implementation. In brief, the method comprises measuring a calibration value, storing a calibration value in a pressure sensor assembly 114, installing the pressure sensor assembly 114, and receiving the calibration value from the pressure sensor assembly 114 after installation.

Still referring to FIG. 4 and in more detail, a calibration value is measured at 402. In some implementations, the calibration value is measured by a calibration system for a given pump, (e.g., pump 118). In one implementation, the calibration value is a frequency value associated with the given pump 118 where the given pump 118 was tested at a fixed pressure. In other implementations, the calibration value is a pressure differential value associated with the given pump 118 where the given pump 118 was tested at a fixed frequency.

The calibration value is stored in a pressure sensor assembly 114 at 404. In some implementations, the determined calibration value (e.g., a pressure differential value or a frequency value) is stored in a storage memory of the pressure sensor assembly. The storage memory may be a one-time erasable memory chip communicatively coupled to an analog voltage sensor output of the pressure sensor assembly 114.

The pressure sensor assembly 114 is installed at 406. In some implementations, the pressure sensor assembly 114 comprising a pump outlet pressure sensor is included at the outlet of the pump 118. The pump outlet pressure sensor may be installed somewhere in the line from the pump 118 to the injector, in the injector, and/or in the return line.

The calibration value is received from the pressure sensor assembly 114 after installation at 408. The calibration value is received during operation of the internal combustion engine. In one implementation, the calibration value (e.g., a pressure differential value or a frequency value) is output by the pressure sensor assembly 114 as an offset at zero pump pressure (relative pressure, bar (g), comparable to an offset to ambient pressure). Please see FIG. 7 for an example zero pump offset. During operation this offset may be trimmed if still present during active pump operation. In another implementation, the calibration value is sent as a continuous signal on the sensor analog voltage output of the pressure sensor assembly 114. The calibration value is multiplexed on to the sensor analog voltage output as a bit stream where it can be decoded to recover the calibration value. Please see FIG. 8 for an example of multiplexing the calibration value on to the sensor analog voltage output. The calibration value may not be multiplexed on to the sensor analog voltage output continuously, but instead at set intervals or on certain conditions. Conditions may include a key on condition, a received request to send the calibration value, and the like. A receive request and send implementation may include a one wire interface communication method where the calibration value is requested and a stop command sent once the value is received (e.g., by the ECM). In another implementation, the calibration value as a bit stream for a predetermined amount of time. The bit stream may have a defined start and end sequence. Please see FIG. 9 for an example of sending as a bit stream for a predetermined amount of time. After the predetermined amount of time, the sensor analog voltage output returns to being the pressure voltage signal. A receive request and send implementation may include a one wire interface communication method where the calibration value is requested and the value sent over the predetermined amount of time (e.g., by the ECM). Receiving of the calibration value may include detection of whether a valid value or a faulty value is received. Please see FIG. 9 for one example of receiving a fault value for the calibration value.

Figure 5:
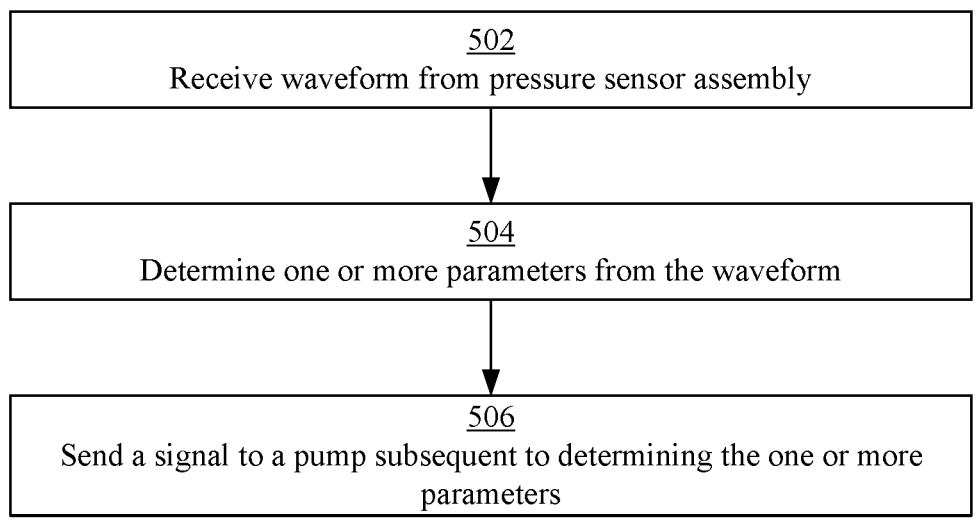
FIG. 5 is a flow diagram depicting communication with a pressure sensor assembly according to an example implementation.

Referring now to FIG. 5, a method or process of communication with a pressure sensor assembly 114 is depicted according to an example implementation. In brief, the method comprises receiving a waveform from a pressure sensor assembly 114, determining one or more parameters from the waveform, and sending a signal to a pump 118 subsequent to determining the one or more parameters.

Still referring to FIG. 5 and in more detail, a waveform is received from a pressure sensor assembly 114 at 502. In some implementations, the waveform is received from the sensor analog voltage output of a pressure sensor assembly 114 where normally the analog voltage output is correlated to a detected pressure of a pressure sensor of the pressure sensor assembly 114.

One or more parameters from the waveform is determined at 504. In some implementations the one or more parameters comprise a calibration value (e.g., a pressure differential value or a frequency value) associated with a pump output by a pressure sensor assembly 114. The calibration value may be determined by receiving the output of the pressure sensor assembly 114 and interpreting the offset at zero pump pressure (relative pressure, bar (g), comparable to an offset to ambient pressure) of the pressure sensor assembly 114 as the calibration value. Then, during normal operation of the internal combustion engine, this offset may be trimmed if still present during active pump operation. In another implementation, the calibration value may be determined by receiving the output by a pressure sensor assembly 114 and decoding a bit stream multiplexed on to the output of the pressure sensor assembly 114 where the bit stream represents the calibration value. The calibration value may be multiplexed continuously and sent as a continuous signal on the sensor analog voltage output of the pressure sensor assembly 114. The calibration value may not be multiplexed on to the sensor analog voltage output continuously, but can instead be decoded at set intervals or on certain conditions. Conditions may include a key on condition, a received request to send the calibration value, and the like. A receive request and send implementation may include a one wire interface communication method where the calibration value is requested and a stop command sent once the value is received (e.g., by the ECM). The calibration value is then decoded from the signal received after the request is made. In another implementation, the calibration value is decoded from a bit stream delivered using the sensor analog voltage output of the pressure sensor assembly 114 for a predetermined amount of time. The bit stream may have a defined start and end sequence. After the predetermined amount of time, the sensor analog voltage output returns to being the pressure voltage signal and the calibration value can no longer be decoded. A receive request and send implementation may include a one wire interface communication method where the calibration value is requested and the value decoded during a predetermined amount of time where the value is sent (e.g., received and decoded by the ECM). Decoding of the calibration value may include detection of whether a valid value or a faulty value is received.

A signal is sent to a pump 118 subsequent to determining the one or more parameters at 506. The signal may modify an input voltage and/or pump frequency command to the pump 118 to achieve a desired flow rate out of the fixed displacement pump 118 based on the calibration value. The signal may start a priming sequence of the pump 118 based on the calibration value and the current sensor analog voltage output from the pressure sensor assembly 114.

Figure 6:
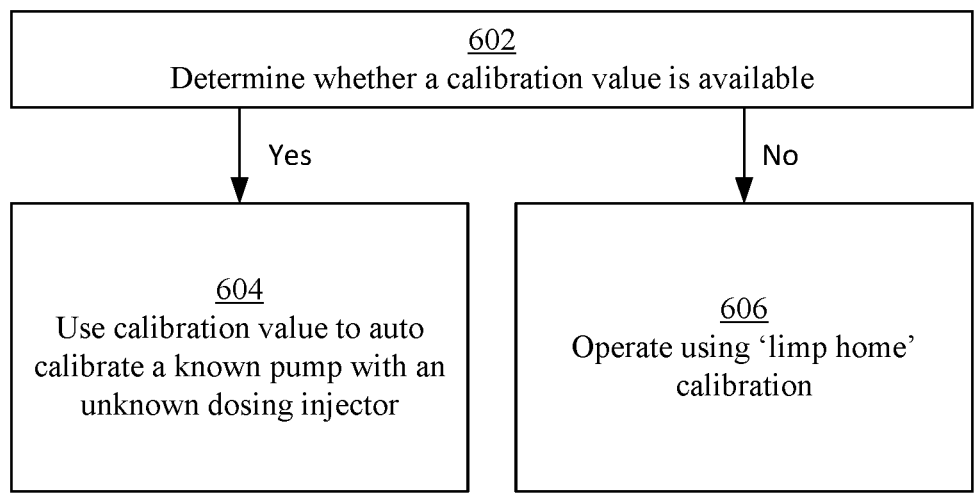
FIG. 6 is a flow diagram depicting options based on the availability of a calibration value according to an example implementation.

Referring now to FIG. 6, a method or process of determining options based on the availability of a calibration value is depicted according to an example implementation. In brief, the method comprises determining whether a calibration value is available. If a calibration value is available, the calibration value is used to auto calibrate a known pump 118 with an unknown dosing injector. If the calibration value is not available, the pump 118 is operating using a pre-determined (i.e., limp home) calibration value.

Still referring to FIG. 6 and in more detail, it is determined whether a calibration value is available at 602. Receiving of the calibration value may include detection of whether a valid value or a faulty value is received. In some implementations, the decoded calibration value is compared against a range of known, good calibration values for detection a valid value. In some implementations, the decoded calibration value is compared against a stored list of possible faulty value conditions for detection of a faulty value or condition. Please see FIG. 9 for one example of receiving a fault value for the calibration value.

If a calibration value is available, the calibration value is used to auto calibrate a known pump 118 with an unknown dosing injector at 604. A signal is sent to a pump 118 subsequent to determining the one or more parameters. The signal may modify an input voltage and/or pump frequency command to the pump to achieve a desired flow rate out of the fixed displacement pump based on the calibration value. The signal may start a priming sequence of the pump 118 based on the calibration value and the current sensor analog voltage output from the pressure sensor assembly 114.

If a calibration value is not available, a pre-determined calibration value is used at 606. A signal is sent to a pump 118 subsequent to determining the one or more parameters. The signal may modify an input voltage and/or pump frequency command to the pump 118 to achieve a desired flow rate out of the fixed displacement pump 118 based on a safe calibration value. The signal may start a priming sequence of the pump 118 based on the calibration value and the current sensor analog voltage output from the pressure sensor assembly 114. An error code may be stored and/or output based on the failure to obtain the calibration value. A display indicator may be engaged or an error code display based on the failure to obtain the calibration value and necessitated use of a safe (e.g., 'limp home') calibration value.

Figure 7:
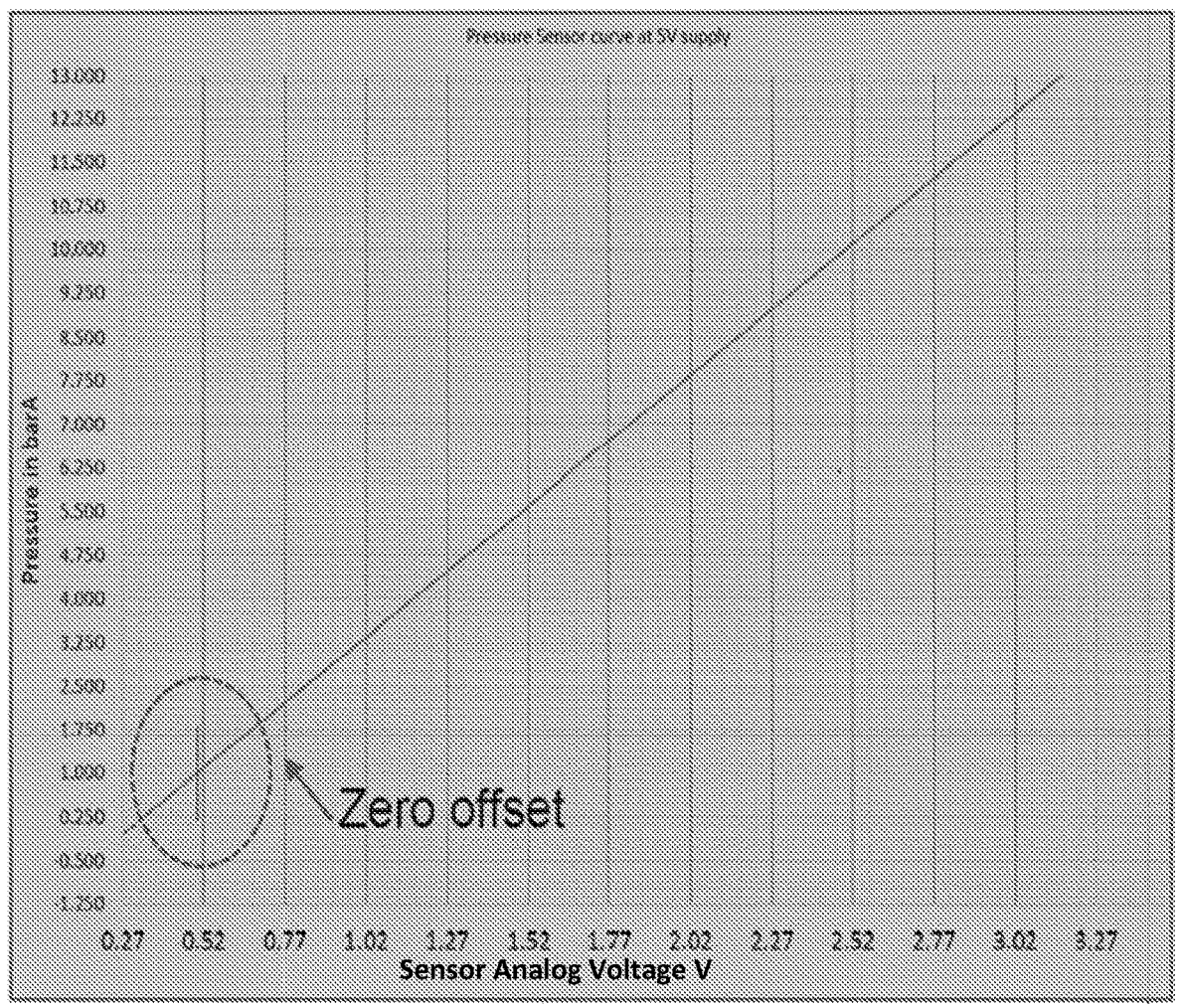
FIG. 7 is a graphical diagram depicting an example zero offset for a pressure sensor curve of an example pressure sensor assembly.

Referring now to FIG. 7, a graphical diagram of an example zero offset for a pressure sensor curve of an example pressure sensor assembly 114 is depicted according to an example implementation. The graphical diagram depicts a sensor analog voltage in Volts (V) from a pressure sensor assembly 114 relative to absolute pressure (bars) and demonstrates the linear relationship. An example zero pump offset is indicated on the graphical diagram for an example pump 118 to obtain a value that can be stored in a pressure sensor assembly 114.

Figure 8:
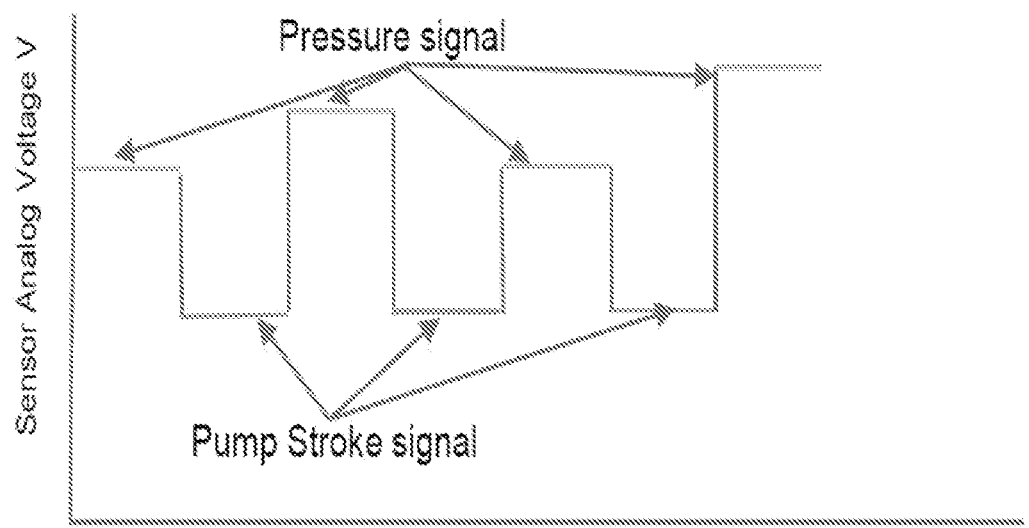
FIG. 8 is a graphical diagram depicting an example encoding of a bit stream in voltage signal from a pressure sensor assembly.

Referring now to FIG. 8, a graphical diagram of an example encoding of a bit stream in a voltage signal from an example pressure sensor assembly 114 is depicted according to an example implementation. In some implementations a bit stream is encoded in the sensor analog voltage received from the pressure sensor assembly 114. The bit stream can be decoded to retrieve one or more parameters from the pressure sensor assembly 114 (e.g., a stored calibration value for the pump 118).

Figure 9:
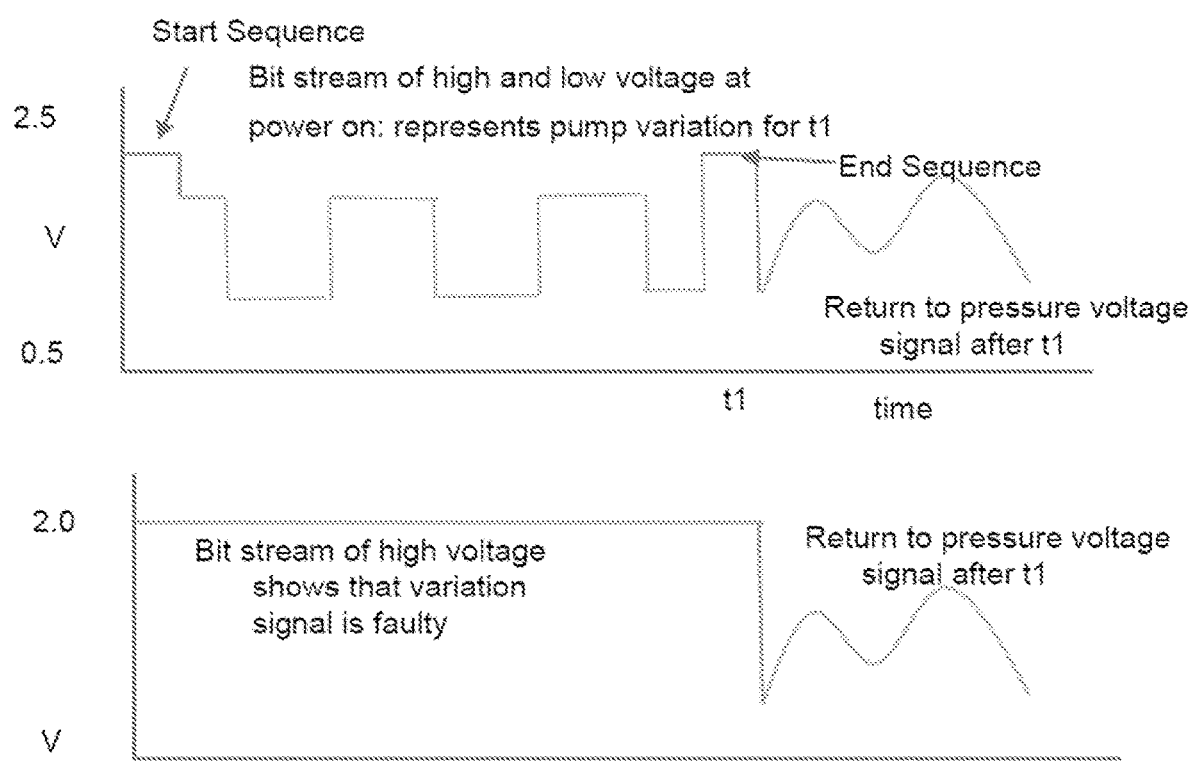
FIG. 9 is a graphical diagram depicting healthy and faulty encoding of a bit stream in a start sequence from a pressure sensor assembly.

Referring now to FIG. 9, a graphical diagram of a healthy and faulty encoding of a bit stream in a start sequence from a pressure sensor assembly 114 is depicted according to an example implementation. In some implementations a bit stream is encoded in the sensor analog voltage received from the pressure sensor assembly 114 during a start sequence. The start sequence may be initiated for a predetermined amount of time (t1). The start sequence may also have a start bit pattern and an end bit pattern, where the end bit pattern indicates that the sequence has ended and a return to a sensor analog voltage signal. The upper portion of FIG. 9 depicts an example of a bit stream encoded as an output substituting for the sensor analog voltage for t1 time, whereupon the signal than returns to the sensor analog voltage signal related to pressure readings by the sensor. The bottom portion of FIG. 9 depicts an example of a faulty signal remaining at a steady voltage during time t1 indicating a faulty signal during the start sequence. The bit stream, if not faulty, can be decoded during the start sequence to retrieve one or more parameters from the pressure sensor assembly 114 (e.g., a stored calibration value for the pump 118).

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A reductant dosing system comprising:
    an injector;
    a fixed displacement pump in fluid communication with the injector;
    a reductant source in fluid communication with the fixed displacement pump;
    a pressure sensor assembly configured to detect a pressure of reductant in the reductant dosing system, and to store a calibration value of the fixed displacement pump; and
    a controller communicatively coupled to the fixed displacement pump and to the pressure sensor assembly, wherein the controller is configured to receive from the pressure sensor assembly data that includes the detected pressure of the reductant and the calibration value, and to calculate a flow rate of the fixed displacement pump based on at least the detected pressure and the calibration value,
    wherein the controller is configured to determine the calibration value by decoding a multiplexed signal on an analog voltage output of the pressure sensor assembly, wherein the multiplexed signal is a combination of a bit stream of the calibration value and an analog voltage output of the pressure sensor assembly correlated to a pressure detected by the pressure sensor assembly.

2. The reductant dosing system of claim 1, wherein the calibration value is an offset at zero pump pressure when the fixed displacement pump is inactive.

3. The reductant dosing system of claim 2, wherein the calibration value is the offset at the zero pump pressure when power is first applied to the reductant dosing system.

4. The reductant dosing system of claim 3, wherein the controller is configured to compensate for the offset at the zero pump pressure while operating the fixed displacement pump.

5. The reductant dosing system of claim 1, wherein the multiplexed signal is generated continuously as the combination of the bit stream of the calibration value and the analog voltage output of the pressure sensor assembly correlated to the pressure detected by the pressure sensor assembly.

6. The reductant dosing system of claim 1, wherein the multiplexed signal is generated at set intervals as the combination of the bit stream of the calibration value and the analog voltage output of the pressure sensor assembly correlated to the pressure detected by the pressure sensor assembly.

7. The reductant dosing system of claim 1, wherein the controller is communicatively coupled to the pressure sensor assembly by a one wire interface and the multiplexed signal is generated responsive to a request sent to the pressure sensor assembly by the controller using the one wire interface.

8. A reductant dosing system comprising:
an injector;
a fixed displacement pump in fluid communication with the injector;
a reductant source in fluid communication with the fixed displacement pump;
a pressure sensor assembly configured to detect a pressure of reductant in the reductant dosing system, and to store a calibration value of the fixed displacement pump; and
a controller communicatively coupled to the fixed displacement pump and to the pressure sensor assembly, wherein the controller is configured to receive from the pressure sensor assembly data that includes the detected pressure of the reductant and the calibration value, and to calculate a flow rate of the fixed displacement pump based on at least the detected pressure and the calibration value,
wherein the controller is configured to determine the calibration value by decoding a bit stream on an analog voltage output of the pressure sensor assembly, wherein the bit stream is sent from the pressure sensor assembly for a predetermined amount of time, after which the analog voltage output of the pressure sensor assembly is a pressure voltage signal correlated to a pressure sensor reading of the pressure sensor assembly.

9. The reductant dosing system of claim 8, wherein the bit stream has a defined start and end sequence.

10. A method of calibrating a reductant dosing system, the method comprising:
detecting, by a pressure sensor assembly, a pressure of reductant in the reductant dosing system;
receiving, by a controller from the pressure sensor assembly, data that includes the detected pressure of the reductant and a calibration value;
operating, by the controller, a fixed displacement pump based on at least the detected pressure of the reductant and the calibration value; and
determining the calibration value by decoding a multiplexed signal on an analog voltage output of the pressure sensor assembly, wherein the multiplexed signal is a combination of a bit stream of the calibration value and an analog voltage output of the pressure sensor assembly correlated to a pressure detected by the pressure sensor assembly.

11. The method of claim 10, wherein the calibration value is an offset at zero pump pressure when the fixed displacement pump is inactive.

12. The method of claim 11, wherein the calibration value is the offset at the zero pump pressure when power is first applied to the reductant dosing system.

13. The method of claim 12, further comprising compensating for the offset at the zero pump pressure while operating the fixed displacement pump.

14. The method of claim 10, wherein the multiplexed signal is generated continuously as the combination of the bit stream of the calibration value and the analog voltage output of the pressure sensor assembly correlated to the pressure detected by the pressure sensor assembly.

15. The method of claim 10, wherein the multiplexed signal is generated at set intervals as the combination of the bit stream of the calibration value and the analog voltage output of the pressure sensor assembly correlated to the pressure detected by the pressure sensor assembly.

16. The method claim 10, further comprising sending a request, by the controller, to the pressure sensor assembly, wherein the controller is communicatively coupled to the pressure sensor assembly by a one wire interface and the multiplexed signal is generated responsive to the request sent by the controller using the one wire interface to the pressure sensor assembly.

17. A method of calibrating a reductant dosing system, the method comprising:
detecting, by a pressure sensor assembly, a pressure of reductant in the reductant dosing system;
receiving, by a controller from the pressure sensor assembly, data that includes the detected pressure of the reductant and a calibration value;
operating, by the controller, a fixed displacement pump based on at least the detected pressure of the reductant and the calibration value; and
determining the calibration value by decoding a bit stream on an analog voltage output of the pressure sensor assembly, wherein the bit stream is sent from the pressure sensor assembly for a predetermined amount of time, after which the analog voltage output of the pressure sensor assembly is a pressure voltage signal correlated to a pressure sensor reading of the pressure sensor assembly.

18. The method of claim 17, wherein the bit stream has a defined start and end sequence.

* * * * *